United States Patent
Kelly et al.

(10) Patent No.: US 8,086,567 B2
(45) Date of Patent: Dec. 27, 2011

(54) APPARATUS AND METHOD FOR STORING DATA

(75) Inventors: Declan Patrick Kelly, Shanghai (CN); Jozef Pieter Van Gassel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 389 days.

(21) Appl. No.: 12/067,985

(22) PCT Filed: Sep. 20, 2006

(86) PCT No.: PCT/IB2006/053383
§ 371 (c)(1),
(2), (4) Date: Mar. 25, 2008

(87) PCT Pub. No.: WO2007/036841
PCT Pub. Date: Apr. 5, 2007

(65) Prior Publication Data
US 2008/0263110 A1     Oct. 23, 2008

(30) Foreign Application Priority Data
Sep. 28, 2005   (CN) .......................... 2005 1 0108915

(51) Int. Cl.
G06F 7/00      (2006.01)
G06F 17/30    (2006.01)
(52) U.S. Cl. ..................................................... 707/622
(58) Field of Classification Search .................. None
See application file for complete search history.

(56) References Cited

U.S. PATENT DOCUMENTS

| | | |
|---|---|---|
| 2003/0055892 A1 | 3/2003 | Huitema et al. |
| 2003/0208540 A1 | 11/2003 | Kawahara et al. |
| 2004/0068611 A1 | 4/2004 | Jacobson et al. |
| 2004/0068636 A1 | 4/2004 | Jacobson et al. |
| 2004/0153481 A1 | 8/2004 | Talluri |
| 2004/0205168 A1 | 10/2004 | Asher |
| 2005/0021617 A1 | 1/2005 | Rusitschka |

OTHER PUBLICATIONS

Druschel et al., "PAST: A large-scale, persistent peer-to-peer storage entity", Proceedings of the Eighth Workshop on Hot Topics in Operating Systems, pp. 75-80, IEEE, 2001.*
Cox et al., "Samsara: Honor Among Thieves in Peer-to-Peer Storage", SOSP '03, pp. 120-132, 2003, ACM.*
Dimitrios Tsoumakos, et al: A Framework for Sharing Voluminous Content in P2P Systems, Department of Computer Science, University of Maryland, pp. 1-6.
Alok Nandan, et al: GhostShare—Reliable and Anonymous P2P Video Distribution, International Center for Theoretical Physics, The STMicroelectronics Under the UC Discovery Grant—CoRe, pp. 1-11.
Takashige Hoshian: Special Feature: P2P Technologies and Related, NTT Network Services Systems Lab. 1998, pp. 12-17.

* cited by examiner

*Primary Examiner* — Michael Hicks

(57) ABSTRACT

The present application provides a storage apparatus for storing data. The storage apparatus comprises storage means for storing data, committing means for committing the availability of a certain storage space to a source device, detecting means for detecting the availability of the certain storage space to produce a detection result, and communication means for informing the source device the detection result, whereby the source device takes corresponding action(s) according to the detection result. In this way, each storage device of a group is bound by its commitment, if it violates its commitment, it risks the loss of its file(s) stored on other members' storage space.

23 Claims, 6 Drawing Sheets

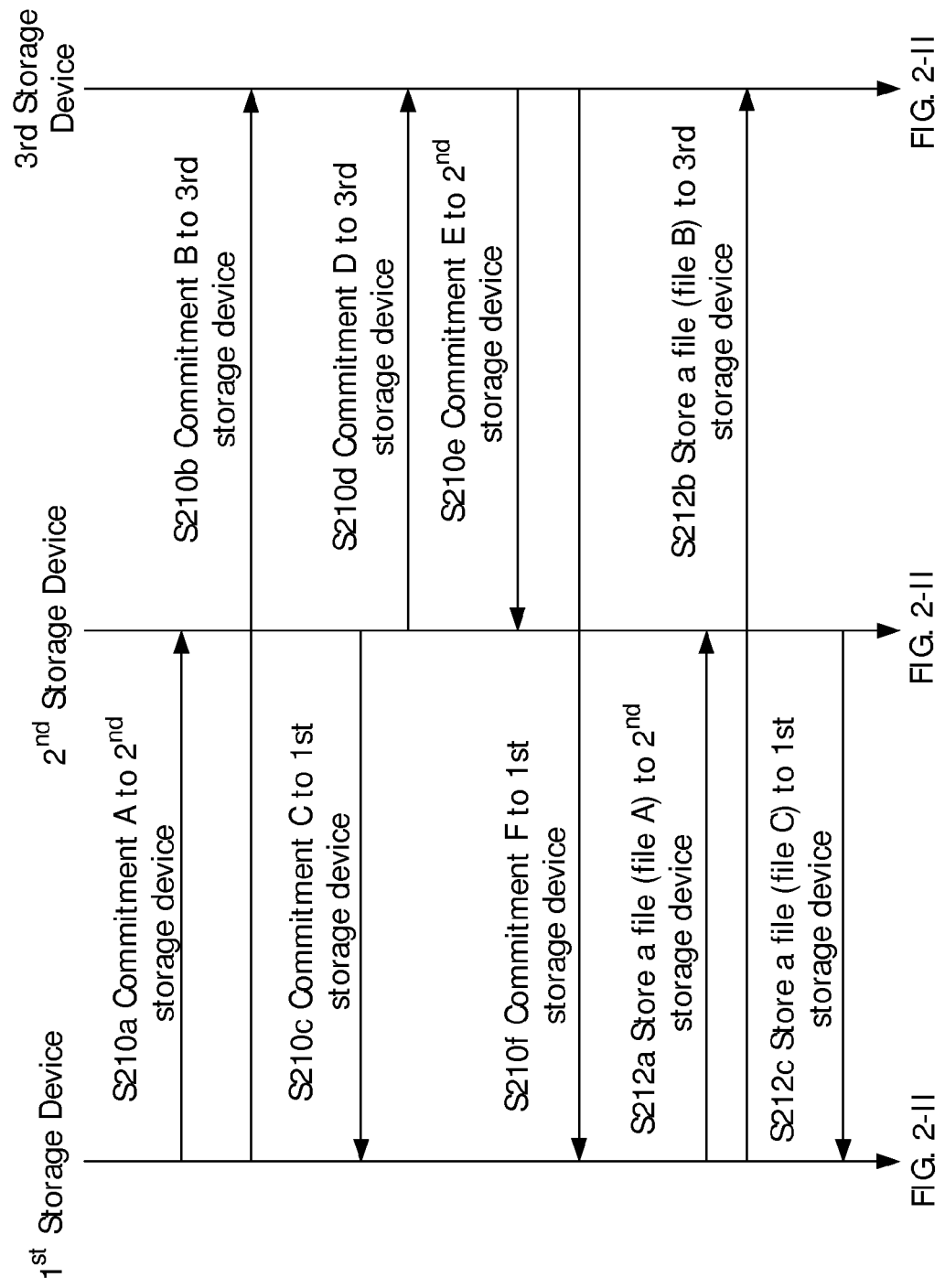
FIG. 2-I

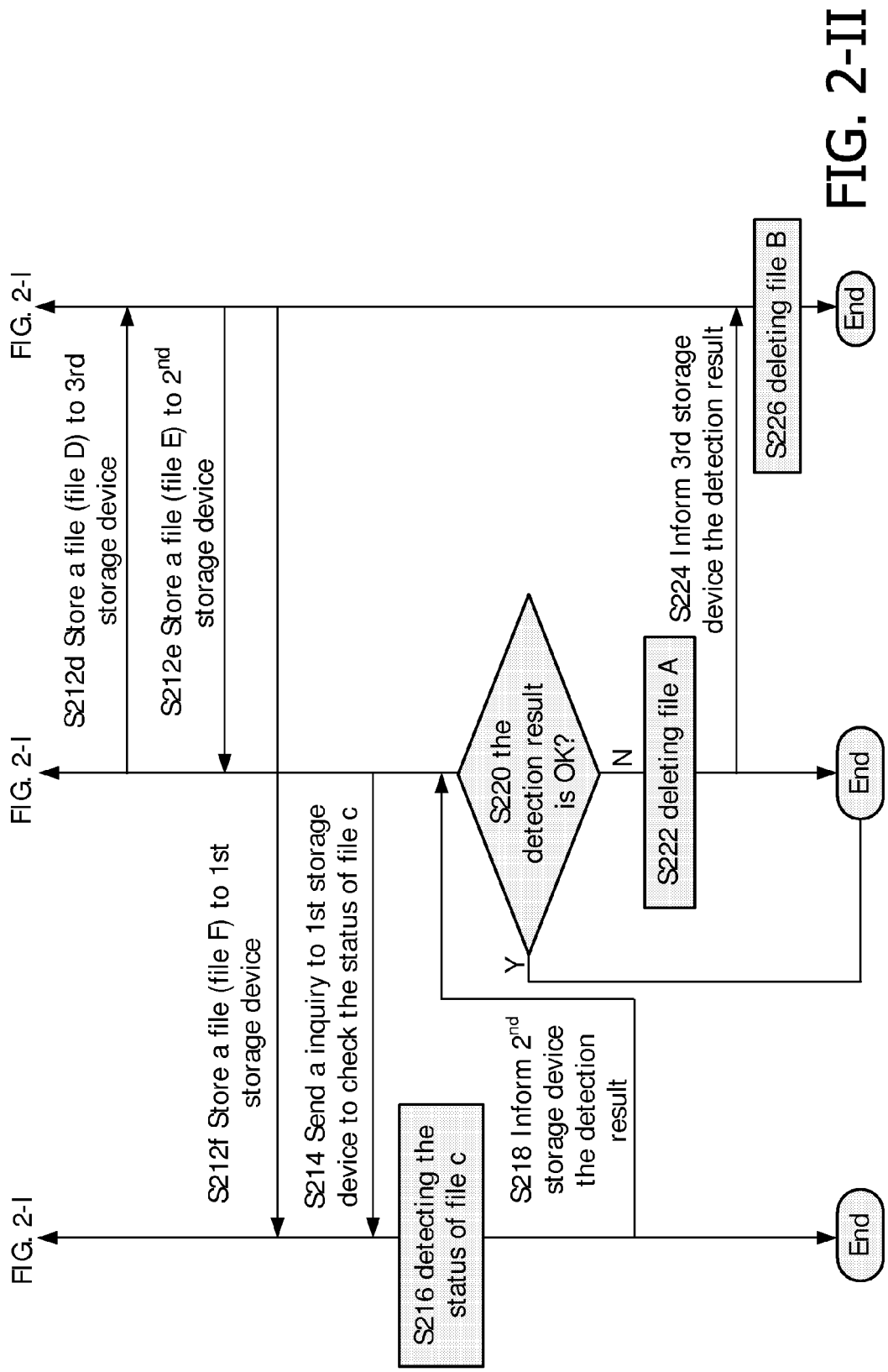
FIG. 2-II

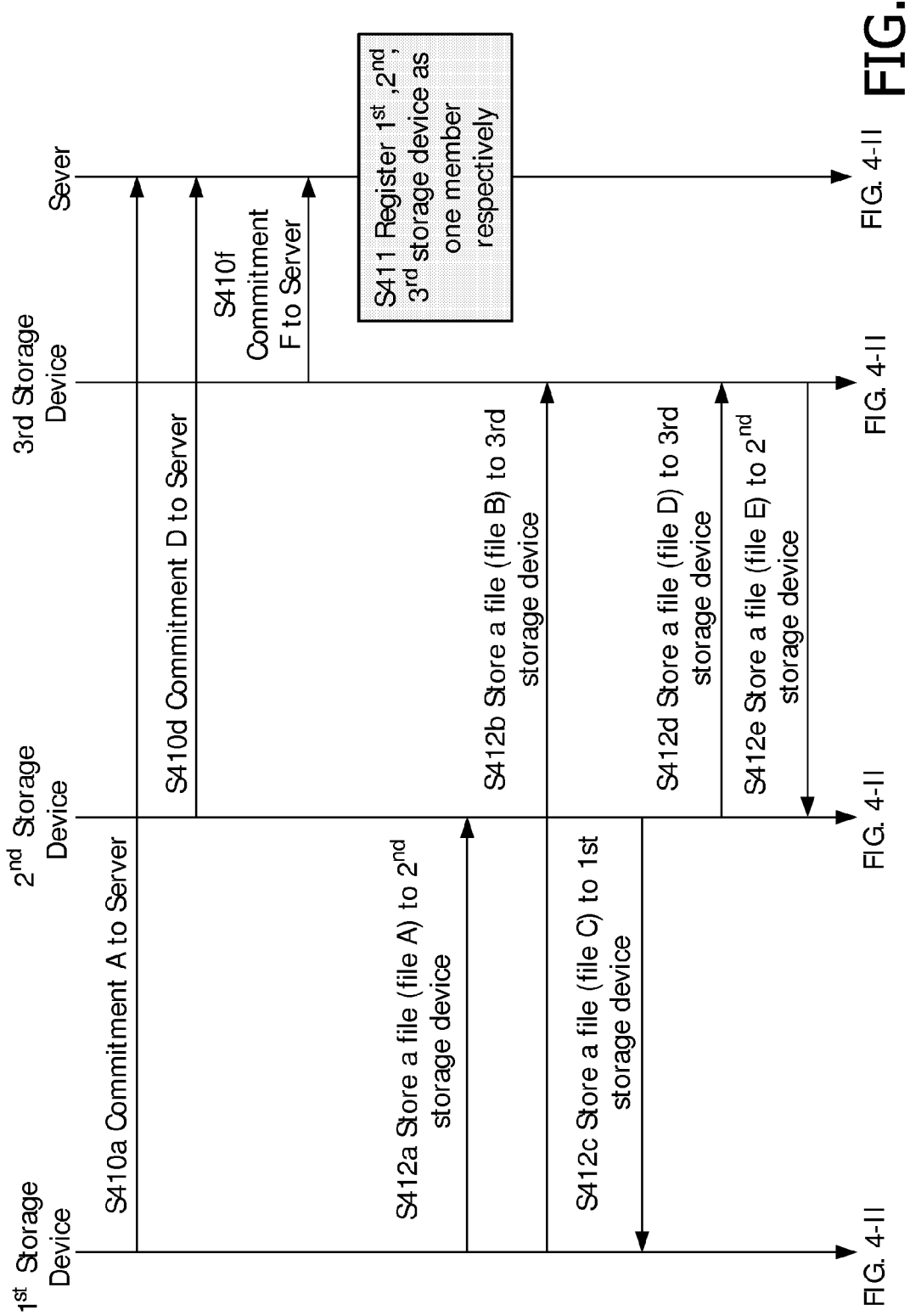

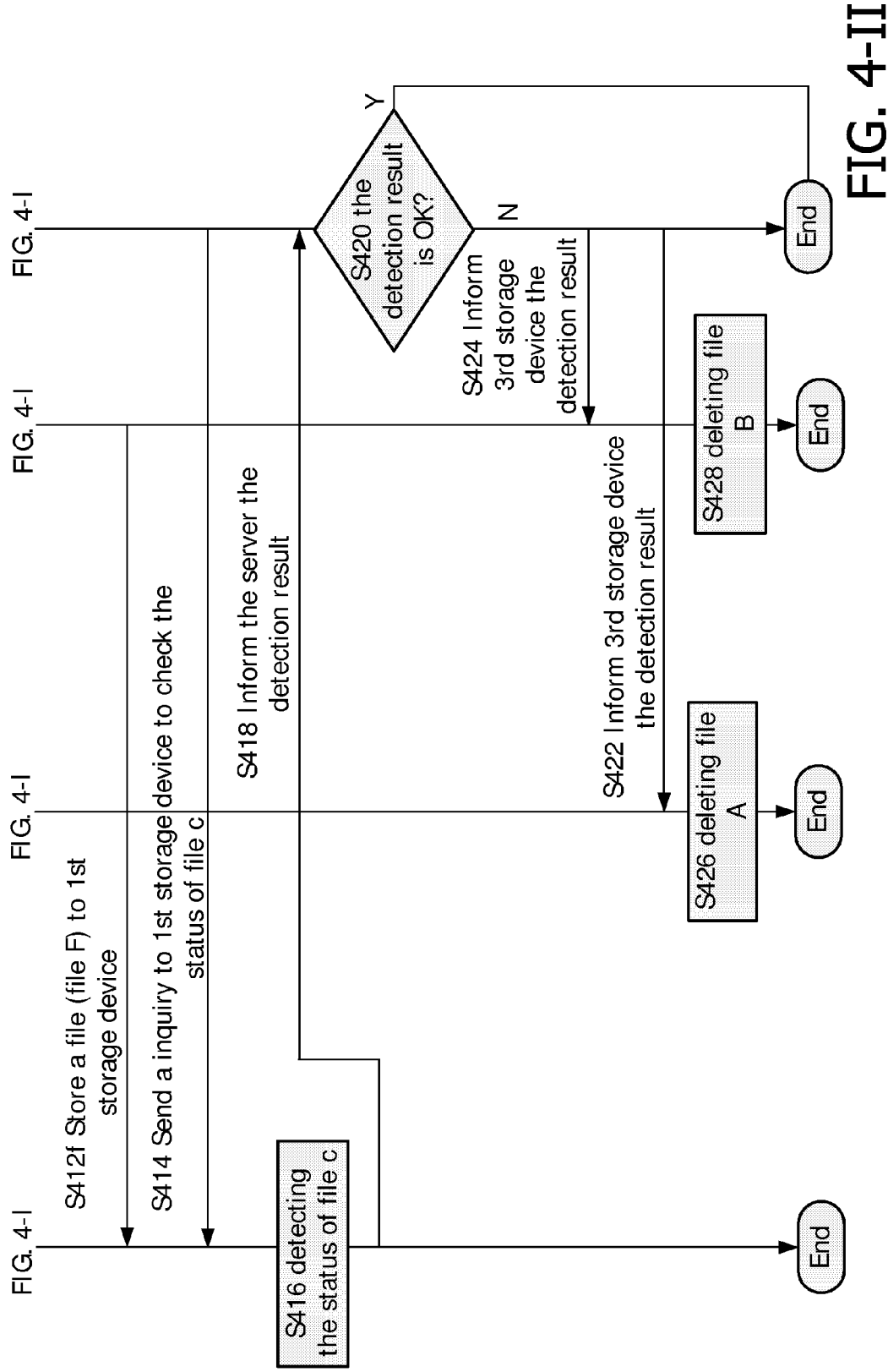
FIG. 4-II

APPARATUS AND METHOD FOR STORING DATA

FIELD OF THE INVENTION

This invention relates generally to the technology of storing data, and more particularly to grouping a plurality of storage devices.

BACKGROUND OF THE INVENTION

It is common practice for users to store data on storage media such as CD-ROMs, digital versatile disks (DVD), magnetic cassettes, magnetic tape, magnetic disk storage, or magnetic hard disk drives. However, data stored on such storage devices can be lost due to fire, flood, theft, or any other event that adversely affects the storage medium. Therefore, it is often wise to generate a back-up copy of the data for storage at an off-site location in order to prevent destruction of both the original data and the back-up copy by the same catastrophic event.

Currently there are several methods to achieve the off-site backup. One example is to physically transport the storage medium containing the back-up copy to the back-up site. Such transportation may lead to further expense and opportunities for media damage. In addition, this method does not provide an efficient system and method for retrieving the stored data from the off-site location.

Another example is that a service provider provides an online centralized server for achieving the file data of its clients. But, prior online data storage systems are located at known sites on the Internet, and are therefore vulnerable to attack from malicious persons (i.e., hackers) attempting to access and/or modify data stored on such systems.

Still another example of the off-site backup is to form a group among a couple of friends/colleagues/relatives, and within this group each member could archive its data on others' storage device. The inefficiency of this solution is its limited sharing resources of storage capacity and its strong requirement of existing trust among group members.

Therefore, to address the inefficiencies of the above methods of off-site backup, there is a need to provide an improved apparatus/method for grouping a plurality of storage devices.

OBJECT AND SUMMARY OF THE INVENTION

It is an object of the invention to provide an improved storage apparatus/method that could provide more sharing resources of trusted storage capacity to a group of storage devices.

The object is achieved in an storage apparatus comprising: storage means for storing data, committing means for committing the availability of a certain storage space to a source device, detecting means for detecting the availability of the certain storage space to produce a detection result, and communication means for informing the source device the detection result, whereby the source device takes corresponding action(s) according to the detection result.

The corresponding action(s) taken by the source device include deleting a file(s) stored in the source device that is originated from the storage apparatus. By setting a rule that violation the commitment made to a group by a group member may risk the loss of the data originated from the group member and stored on other members' storage spaces, each member are bound by its commitment to the group.

According to one embodiment of the invention, the availability of the certain storage space includes the accessibility of the certain storage space, undisturbance of a file originated from the source device stored in the certain storage space of the storage apparatus.

According to another embodiment of the invention, the storage apparatus further comprises deleting means for deleting a file(s) stored in the storage apparatus that is originated from the source device.

According to still another embodiment of the invention, the storage apparatus further comprises inquiring means for sending a inquiry to the source device for detecting the availability of a certain storage space of the source device. The storage apparatus and the source device belong to a group, the group includes a third device, the communication means informs the third device a responsive detection result corresponding to the inquiry, whereby the third device takes corresponding action(s) according to the responsive detection result.

The object is also achieved in a method for storing data. The method comprises the steps of committing the availability of a certain storage space to a source device, detecting the availability of the certain storage space to produce a detection result, and informing the source device the detection result, whereby the source device takes corresponding action(s) according to the detection result.

It is another object of the invention to provide a grouping apparatus for grouping a plurality of storage devices so that each storage device could store its data on other storage devices belonging to the same group in a trust environment.

The object is achieved in an apparatus for grouping a first storage device and a second storage device. The apparatus comprises communication means for receiving a commitment of the availability of a certain storage space from the first storage device and another commitment of the availability of another certain storage space form the second storage device, registering means for respectively registering the first storage device and the second storage device as one member of a group, detecting means for detecting the availability of the certain storage space of the first storage device to produce a detection result, wherein the commutation means further for informing the second storage device the detection result, whereby the second storage device takes corresponding action(s) according to the detection result.

The object is also achieved in a method for grouping a first storage device and a second storage device, the method comprises the step of receiving a commitment of the availability of a certain storage space from the first storage device and another commitment of the availability of another certain storage space form the second storage device, respectively registering the first storage device and the second storage device as one member of a group, detecting the availability of the certain storage space of the first storage device to produce a detection result, and informing the second storage device the detection result, whereby the second storage device takes corresponding action(s) according to the detection result.

Other objects and attainments together with a fuller understanding of the invention will become apparent and appreciated by referring to the following description and claims in conjunction with the accompanying drawings.

BRIEF DESCRIPTION OF THE DRAWINGS

The invention is explained in further detail, and by way of examples, with reference to the accompanying drawings wherein:

FIG. 2 is a flow chart illustrating a peer-to-peer grouping process according to one embodiment of the invention, FIG. 4 is a flow chart illustrating a centralized grouping process according to another embodiment of the invention.

Throughout the drawings, the same reference numerals indicate similar or corresponding features or functions.

DETAILED DESCRIPTION OF THE INVENTION

Figure 1:
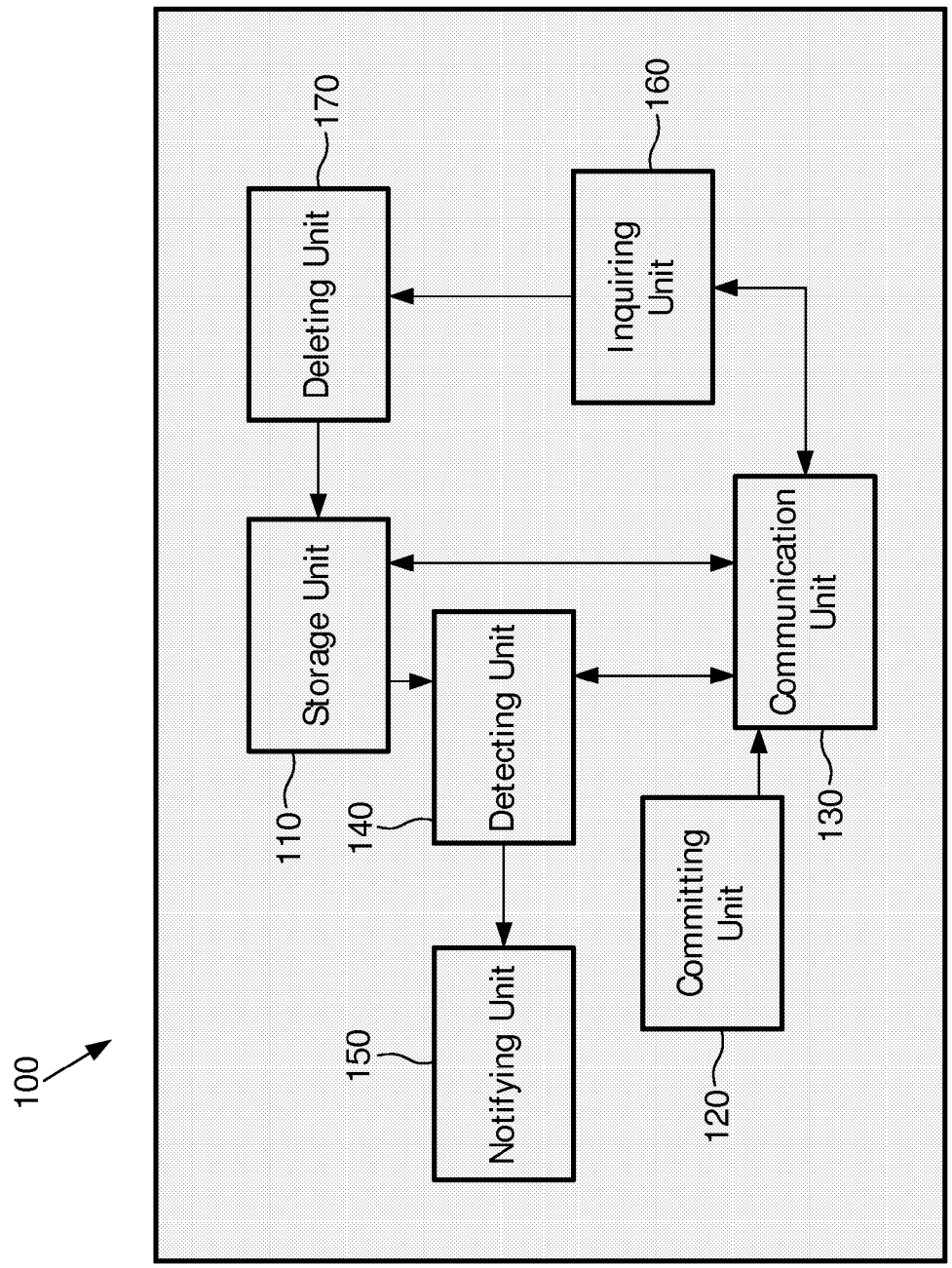
FIG. 1 is a schematic diagram of a storage apparatus according to one embodiment of the invention.

FIG. 1 is a schematic diagram of a storage apparatus according to one embodiment of the invention.

Storage apparatus 100 includes a storage unit 110, a committing unit 120, a communication unit 130 and a detecting unit 140. It further includes a notifying unit 150, an inquiring unit 160 and a deleting unit 170. The storage apparatus 100 is a component of a personal computer. It could also be a component of a consumer electric device, for example, a mobile phone or a personal digital assistant.

Storage unit 110 includes a storing driver (not shown) and a storage medium (not shown). The storage medium is a fixed one, such as a hard disc. It could also be a removable one, such as an optical disc. The storage unit 110 stores the to-be-stored data on the storage medium, and it also retrieves the stored data from the storage medium.

Committing unit 120 makes a commitment of the availability of a certain storage space to a source device (not shown). The source device is another storage apparatus, and it could also be a centralized server that is responsible for grouping a plurality of storage apparatus.

The commitment includes the accessibility of the certain storage space, undisturbance of a file originated from the source device stored in the certain storage space of the storage apparatus. For example, the commitment is 4 gigabytes of storage capacity sharing with other storage devices, at least 2 hours per day of online accessibility.

Communication unit 130 is a wired/wireless Internet communication device. It could also be any other devices that could provide communication channel between the storage apparatus 100 and the source device. Such a communication is a peer-to-peer one. It could also be via a centralized server.

Communicating unit 130 talks with the source device about the commitment, and if the source device could also make a similar commitment, the storage apparatus and the source device forms a group. After forming a group, the source device stores a file on the storage unit 110.

Detecting unit 140 detects the availability of the certain storage space to produce a detection result. The detecting unit 140 checks the status of the file stored on the storage unit 110 which is originated from the source device, and it could also check the online access time of the storage apparatus 100. The detection results may include the file from the source device is still there, the file is undisturbed, and/or the online access time exceeds the minimum requirement, and etc.

The detection could be proactive or passive. The proactive way is that the detecting unit 140 initiates the inspection of the availability of the certain storage space periodically by itself. The passive way it that the detecting unit 140 initiates the inspection of the availability of the certain storage space upon receiving a request from the source device.

The detecting unit 140 could maintain a list of all files originated from other storage apparatus, so that it is easy for it to carry out its detection.

The notifying unit 150 notifies the owner of the storage apparatus the detection result before informing the source device in case the user inadvertently violates the commitment.

The inquiring unit 160 sends an inquiry to the source device for detecting the availability of a certain storage space of the source device.

The storage apparatus 100 receives a responsive detection result form the source device according to the inquiry, and if the responsive detection result is negative, for example, a file from the storage apparatus 100 is not stored on the source device any more, the deleting unit 170 deletes the file originated form the source device which is stored on the storage unit 110. The deleting unit 170 could also block the accessibility of the file from the source device for a period of time before deleting it in case the source device inadvertently violates the commitment.

The group formed by the storage apparatus 100 and the source device may includes a third device, the communication means 130 informs the third device a responsive detection result corresponding to the inquiry, whereby the third device takes corresponding action(s) according to the responsive detection result.

The deleting unit 170 also could act on a detection result provided proactively by the source device.

The invention can also be implemented by means of a suitably programmed computer provided with a computer program for storing data. The computer program product for storing data comprises code for committing the availability of a certain storage space to a source device, code for detecting the availability of the certain storage space to produce a detection result, and code for informing the source device the detection result, whereby the source device takes corresponding action(s) according to the detection result. Such a computer program product may be stored in a storage carrier.

These portions of program code may be provided to a processor to produce a machine, such that the code that executes on the processor create means for implementing the functions specified as above.

FIG. 2 is a flow chart illustrating a peer-to-peer grouping process according to one embodiment of the invention.

The group involves $1^{st}$ storage device, $2^{nd}$ storage device, and $3^{rd}$ storage device. All three storage devices have the functions of storage apparatus 100 as illustrated in FIG. 1. The communication way among the three storage devices is peer-to-peer.

The three storage devices could belong to different users that do not need to know each other. The geographic locations of each storage device could also be irrelevant as long as they could communicate with each other.

Firstly, the three storage devices make commitments to each other to form a group (step 210). This group could also be already existed, and each storage device could join as a new member.

The commitments include commitment A made by $1^{st}$ storage device to $2^{nd}$ storage device (step 210a), commitment B made by $1^{st}$ storage device to $3^{rd}$ storage device (step 210b), commitment C made by $2^{nd}$ storage device to $1^{st}$ storage device (step 210c), commitment D made by $2^{nd}$ storage device to $3^{rd}$ storage device (step 210d), commitment E made by $3^{rd}$ storage device to $2^{nd}$ storage device (step 210e), and commitment F made by $3^{rd}$ storage device to $1^{st}$ storage device (step 210f).

The commitment includes the accessibility of the certain storage space of each storage device, undisturbance of a file stored on the certain storage space of one of the three storage devices which is originated from another one of the three storage devices.

The commitments A to F could be same, or could be different from each other, as long as each commitment reaches a predetermined registration rule of the group. For example, the registration rule is that 3 gigabytes of storage capacity sharing with other storage devices, at least 1 hours per day of online accessibility, and commitment A is that 4 gigabytes of storage capacity sharing with other storage devices, at least 2 hours per day of online accessibility.

Secondly, After forming a group, the group member stores its data to other members' storage space (step 212). For example, $1^{st}$ storage device stores file A to $2^{nd}$ storage device, $1^{st}$ storage device stores file B to $3^{rd}$ storage device, $2^{nd}$ storage device stores file C to $1^{st}$ storage device, $2^{nd}$ storage device stores file D to $3^{rd}$ storage device, $3^{rd}$ storage device stores file E to $2^{nd}$ storage device, and $3^{rd}$ storage device stores file F to $1^{st}$ storage device.

The files A to F could be encrypted by its owner before they are stored.

In order to ensure that if one member violates its commitment, all other members in this group still could retrieve their files, it is understandable for one member to create some redundancy for the files stored in other members' storage spaces. One member may create some redundancy for its file, and split this file and the redundancy into several pieces, then store each piece on different member's storage device.

It is also understandable that if the redundancy is well designed, even if 2 or more members of a big group violate their commitments, the other members still could retrieve their files according to the techniques of redundancy.

Techniques for adding redundancy to data to ensure that the data is available even when some parts are missing are known from Error Correction Codes, and professional storage systems that guarantee data availability—so called RAID (Redundant Array of Inexpensive Disks) systems are also known.

Thirdly, The $2^{nd}$ storage device sends a inquiry to $1^{st}$ storage device to check the status of file C (step 214), the status of file C includes whether $1^{st}$ storage device is available, whether file C is still there, whether file C is undisturbed, and etc. The $1^{st}$ storage device may not be available (for example, online connected) around the clock, so the inquiry may need to have a life cycle (for example, 24 hours), and once the $1^{st}$ storage device is available, it could receive the inquiry.

Upon the inquiry, the $1^{st}$ storage device detects the status of file C, and produces a detection result (S216). The detection result is that file C is undisturbedly stored on the $1^{st}$ storage device. The detection result could also be that file C is deleted and no longer stored on the $1^{st}$ storage device any more. The detection result could also be that file C is modified by the owner of the $1^{st}$ storage device.

The detection result could also include the accessibility of the $1^{st}$ storage device, for example, 2.5 hours today.

The $1^{st}$ storage device informs the $2^{nd}$ storage device the detection result. Before informing the $2^{nd}$ storage device, the owner of the $1^{st}$ storage device may be notified the detection result in case the owner inadvertently violates its commitment.

Alternatively, without step 214, the $1^{st}$ storage device may proactively carry out the detection on its own initiative periodically, and report the detection results to the $2^{nd}$ storage device.

Fourthly, The $2^{nd}$ storage device evaluate whether the detection result violates the commitment A. if the answer is NO, the whole process ends.

If the answer is YES, the $2^{nd}$ storage device delete the file(s) originated from $1^{st}$ storage device which is stored on the $2^{nd}$ storage device, for example, file A (step 222). And the 2 storage device informs the $3^{rd}$ storage device the detection result (step 224).

Alternatively, in case $1^{st}$ storage device inadvertently violates the commitment A, the $2^{nd}$ storage device may block the accessibility of file A for a period of time before physically deleting file A, so that the $1^{st}$ storage device may take some relief measures during the period of time.

Finally, the $3^{rd}$ storage device deletes the file(s) originated from $1^{st}$ storage device that is stored on the $3^{rd}$ storage device; for example, file B (step 226).

It is understandable if the group has more than 3 members, the $2^{nd}$ storage device may inform the $4^{th}$, $5^{th}$, . . . storage devices the detection results, and the $4^{th}$, $5^{th}$, . . . storage device may delete the file(s) originated from the $1^{st}$ storage device.

It is also understandable that each member in this group may have the same functions as illustrated above, for example, the $3^{rd}$ storage device may initiate an inquiry to detect the $2^{nd}$ storage device, and the $1^{st}$ storage device may initiate an inquiry to detect the $3^{rd}$ storage device.

Figure 3:
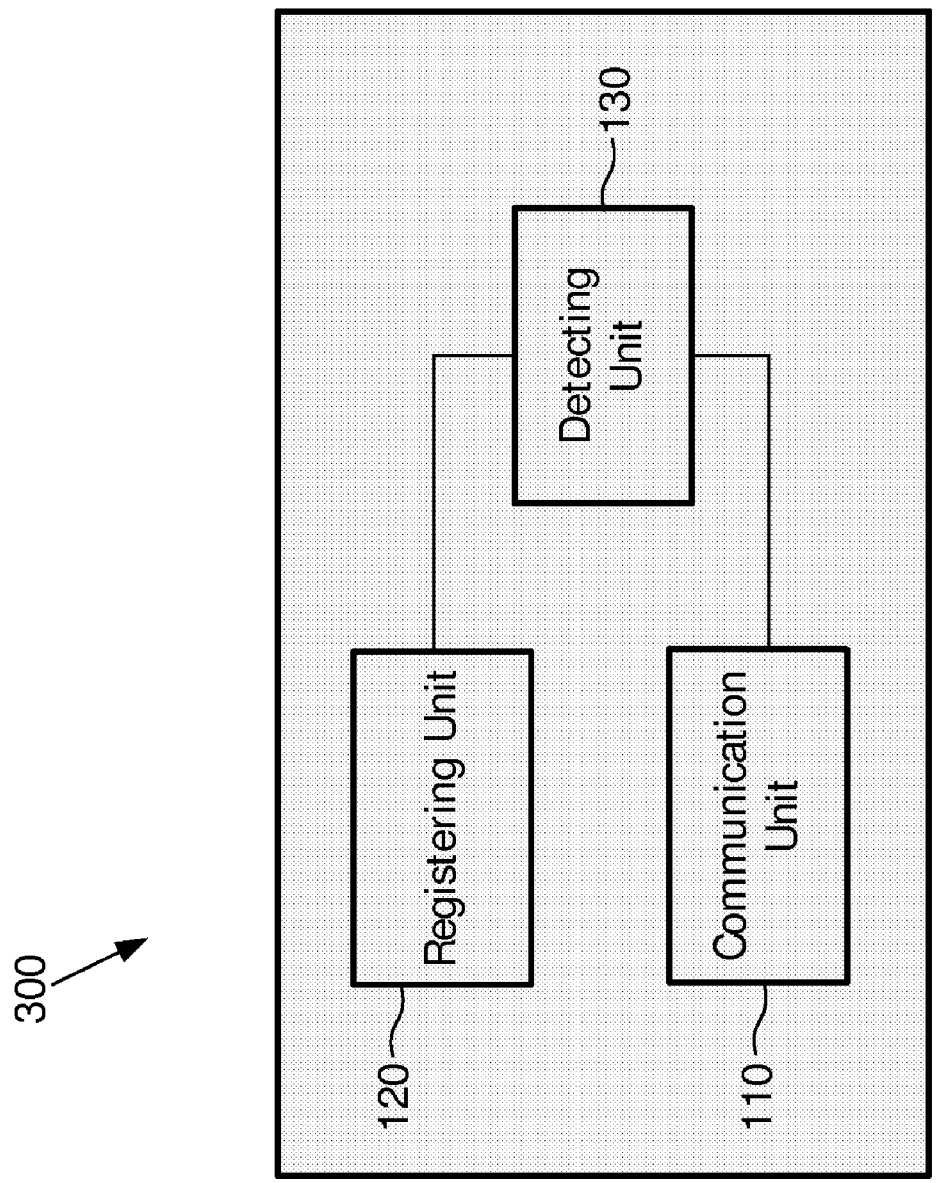
FIG. 3 is a schematic diagram of a grouping apparatus according to another embodiment of the invention.

FIG. 3 is a schematic diagram of a grouping apparatus according to another embodiment of the invention.

Grouping apparatus 300 is a part of a server that organizes at least 2 storage devices as members into a group according to a predetermined registration rule. The owner of each member does not need to know each other, and the geographic locations of each storage device could also be irrelevant.

Grouping apparatus 300 includes a communication unit 110, a registering unit 120 and a detecting unit 130.

Communication unit 130 receives a commitment of the availability of a certain storage space from each storage device to share with other storage devices.

The commitment includes the accessibility of the certain storage space of each storage device, undisturbance of a file stored on the certain storage space of one member storage device that is originated from another member storage device.

Registering unit 110 respectively registers each storage device as one member of a group according to the commitment from each storage device and the predetermined registration rule.

The registration rule could be that 3 gigabytes of storage capacity sharing with other storage devices, at least 1 hours per day of online accessibility, and the commitment could be that 4 gigabytes of storage capacity sharing with other storage devices, at least 2 hours per day of online accessibility.

Detecting unit 130 detects the availability of the certain storage space of each member, and produces a detection result(s), and then the commutation unit 110 informs the other storage device(s) the detection result if one member violates its commitment, whereby the other storage device(s) could take corresponding action(s) according to the detection result, for example, delete the file(s) originated from the member who violates its commitment.

The detection could be proactive or passive. The proactive way is that the detecting unit 130 initiates an inquiry of the availability of the certain storage space to each member periodically, and gets the responsive detection result(s) from each member. The passive way is that each member inspect its behavior on its own initiative and reports the detection result to grouping apparatus 300 periodically, thus the detecting unit 130 of grouping apparatus 300 collects the detection result(s) reported by each member.

The invention can also be implemented by means of a suitably programmed computer provided with a computer program for grouping a first storage device and a second storage device. The computer program product for grouping a first storage device and a second storage device comprises code for receiving a commitment of the availability of a certain storage space from the first storage device and another commitment of the availability of another certain storage space form the second storage device, code for respectively registering the first storage device and the second storage device as one member of a group, code for detecting the availability of the certain storage space of the first storage device to produce a detection result, and code for informing the second storage device the detection result, whereby the second storage device takes corresponding action(s) according to the detection result. Such a computer program product may be stored in a storage carrier.

These portions of program code may be provided to a processor to produce a machine, such that the code that executes on the processor create means for implementing the functions specified as above.

FIG. 4 is a flow chart illustrating a centralized grouping process according to another embodiment of the invention.

This process is quite similar to the process of FIG. 2. The main difference is that there is a centralized server that coordinates the registration of the group member, and the server could also monitor the behavior of each member to detect whether the member violates its commitment.

Each storage device ($1^{st}$, $2^{nd}$, and $3^{rd}$) sends its commitment (A, D, F) to the server (step 410), then the server registers $1^{st}$, $2^{nd}$, and $3^{rd}$ storage device as one member of a group respectively according to a predetermined rule. This group could also be already existed, and a storage device could join as a new member.

After forming/joining a group, each storage device could store its file(s) on other member storage devices (step 412).

The server sends an inquiry to $1^{st}$ storage device to check the status of file C (step 414), and the $1^{st}$ storage device detects the status of file C to produces a detection result (step 416) and informs the server the detection result (step 418).

If the detection result does not violate commitment A (step 420), the process ends.

If the detection result violates commitment A (step 420), the server informs the other members, $2^{nd}$ storage device and $3^{rd}$ storage device (step 422, 424) the detection result, and the other members take corresponding action(s) according to the detection result, for example, delete file A (step 426) and delete file B (step 428).

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

The invention claimed is:

1. A storage apparatus, comprising:
   storage means for storing data;
   committing means for making a commitment of an availability of a certain storage space of the storage means to a source device, wherein the storage apparatus and the source device are within a group of devices in a trust environment, wherein each group member device is bound by its respective commitment to the group of devices, wherein the commitments of the group member devices can be different from each other as long as each commitment reaches a registration rule of the group of devices, wherein the registration rule comprises (a) a predetermined minimum storage capacity sharing with other group member devices, (b) an undisturbance of a file originated from the source device stored in the certain storage space, and (c) a predetermined minimum requirement of number of hours per day of online accessibility of the certain storage space;
   detecting means for detecting the availability of the certain storage space of the storage means to produce a detection result (i) by itself or (ii) in response to an inquiry received from the source device, wherein the detection result includes an indication that (a) a file from the source device stored by the storage apparatus is still there, (b) the stored file is undisturbed, and (c) an online accessibility exceeds the minimum requirement; and
   communication means for informing the source device of the detection result, wherein responsive to a detection result indicating that the commitment is violated, the source device takes corresponding action(s) to delete, and thereby cause loss of data of, a file(s) originated from the storage apparatus and stored outside the storage apparatus within the group of devices.

2. The storage apparatus of claim 1, wherein the communication means is further for (i) sending (i)(a) the stored data and/or (i)(b) data to-be-stored and/or (ii) receiving (ii)(a) the stored data and/or (ii)(b) data to-be-stored.

3. The storage apparatus of claim 1, wherein the communication means is configured to receive an inquiry from the source device, and wherein the detecting means detects the availability of the certain storage space to produce the detection result in response to the inquiry.

4. The storage apparatus of claim 1, further comprising:
   notifying means for notifying an owner of the storage apparatus of the detection result before informing the source device of the detection result.

5. The storage apparatus of claim 1, wherein the file(s) originated from the storage apparatus is/are stored in the source device, and wherein the corresponding action(s) taken by the source device include deleting the file(s) directly from the source device.

6. The storage apparatus of claim 1, wherein the storage apparatus and the source device belong to a group, and the group includes a further device, wherein the file(s) originated from the storage apparatus is/are stored in the further device, and wherein the corresponding action(s) taken by the source device include informing the further device to delete the file(s) stored in the further device that originated from the storage apparatus.

7. The storage apparatus of claim 1, further comprising:
   deleting means for deleting a file(s) stored in the storage apparatus that is originated from the source device in response to a detection result indicating that a commitment is violated by the source device.

8. The storage apparatus of claim 1, further comprising:
   inquiring means for sending a inquiry to the source device for detecting the availability of a certain storage space of the source device,
   wherein the storage apparatus and the source device belong to a group, the group includes a further device, and wherein the communication means informs the further device of a responsive detection result corresponding to the inquiry, wherein responsive to the detection result indicating an availability of a certain storage space of the source device is negative, the further device takes corresponding action(s) to delete a file(s) originated from the source device and stored outside the source device.

9. A method for storing data of a storage device of a storage apparatus on a source device, comprising:
  committing an availability of a certain storage space of the storage device of the storage apparatus to the source device via a commitment, wherein the storage apparatus and the source device are within a group of devices in a trust environment, wherein each group member device is bound by its respective commitment to the group of devices, wherein the commitments of the group member devices can be different from each other as long as each commitment reaches a registration rule of the group of devices, wherein the registration rule comprises (a) a predetermined minimum storage capacity sharing with other group member devices, (b) an undisturbance of a file originated from the source device stored in the certain storage space, and (c) a predetermined minimum requirement of number of hours per day of online accessibility of the certain storage space;
  detecting the availability of the certain storage space of the storage device of the storage apparatus to produce a detection result (i) by itself or (ii) in response to an inquiry received from the source device, wherein the detection result includes an indication that (a) a file from the source device stored by the storage apparatus is still there, (b) the stored file is undisturbed, and (c) an online accessibility exceeds the minimum requirement; and
  informing the source device of the detection result, wherein responsive to a detection result indicating that the commitment is violated, the source device takes corresponding action(s) to delete, and thereby cause loss of data of, a file(s) originated from the storage apparatus and stored outside the storage apparatus within the group of devices.

10. The method of claim 9, further comprising the step of (i) sending (i)(a) the stored data and/or (i)(b) data to-be-stored and/or (ii) receiving (ii)(a) stored data and/or (ii)(b) data to-be-stored.

11. The method of claim 9, further comprising the step of receiving an inquiry from the source device, and wherein the detecting step further comprises the step of detecting the availability of the certain storage space to produce the detection result in response to the inquiry.

12. The method of claim 9, further comprising the step of notifying an owner of the storage apparatus of the detection result before informing the source device of the detection result.

13. The method of claim 9, wherein the file(s) originated from the storage apparatus is/are stored in the source device, and wherein the corresponding action(s) taken by the source device include deleting the file(s) directly from the source device.

14. The method of claim 9, wherein the storage device and the source device belong to a group, the group includes a further device, wherein the file(s) originated from the storage apparatus is/are stored in the further device, and wherein the corresponding action(s) taken by the source device include informing the further device to delete the file(s) stored in the further device that originated from the storage apparatus.

15. The method of claim 9, further comprising the step of storing a file(s) originated from the source device on the certain storage space.

16. The method of claim 15, further comprising the step of deleting the file(s) stored in the certain storage space that originated from the source device in response to a detection result indicating that a commitment is violated by the source device.

17. The method of claim 9, further comprising the step of sending an inquiry to the source device for detecting the availability of a certain storage space of the source device, wherein the storage device and the source device belong to a group, the group includes a further device, wherein the method further comprising the step of informing the further device of a responsive detection result corresponding to the inquiry, wherein responsive to the detection result indicating an availability of a certain storage space of the source device is negative, the further device takes corresponding action(s) to delete a file(s) originated from the source device and stored outside the source device.

18. A computer-readable medium embodied with a computer program executable by a computer for storing data of a storage device of a storage apparatus on a source device, comprising:
  code for committing an availability of a certain storage space of the storage apparatus to the source device via a commitment, wherein the storage apparatus and the source device are within a group of devices in a trust environment, wherein each group member device is bound by its respective commitment to the group of devices, wherein the commitments of the group member devices can be different from each other as long as each commitment reaches a registration rule of the group of devices, wherein the registration rule comprises (a) a predetermined minimum storage capacity sharing with other group member devices, (b) an undisturbance of a file originated from the source device stored in the certain storage space, and (c) a predetermined minimum requirement of number of hours per day of online accessibility of the certain storage space;
  code for detecting the availability of the certain storage space of the storage device of the storage apparatus to produce a detection result (i) by itself or (ii) in response to an inquiry received from the source device, wherein the detection result includes an indication that (a) a file from the source device stored by the storage apparatus is still there, (b) the stored file is undisturbed, and (c) an online accessibility exceeds the minimum requirement; and
  code for informing the source device of the detection result, wherein responsive to a detection result indicating that the commitment is violated, the source device takes corresponding action(s) to delete, and thereby cause loss of data of, a file(s) originated from the storage apparatus and stored outside the storage apparatus within the group of devices.

19. A grouping apparatus for grouping a plurality of storage devices including a first storage device and a second storage device, comprising:
  communication means for receiving a commitment of an availability of a certain storage space from the first storage device within a group of devices in a trust environment and another commitment of an availability of another certain storage space from the second storage device within the group of devices, wherein the commitments of the group member devices can be different from each other as long as each commitment reaches a registration rule of the group of devices, wherein the registration rule comprises (a) a predetermined minimum storage capacity sharing with other group member devices, (b) an undisturbance of a file originated from a source device stored in the certain storage space, and (c)

a predetermined minimum requirement of number of hours per day of online accessibility of the certain storage space;

registering means for respectively registering the first storage device and the second storage device as one member of the group of devices, wherein each group member device is bound by its respective commitment to the group of devices; and detecting means for detecting the availability of the certain storage space of the first storage device to produce a detection result (i) by itself or (ii) in response to an inquiry received from the source device, wherein the detection result includes an indication that (a) a file from the source device stored by the storage apparatus is still there, (b) the stored file is undisturbed, and (c) an online accessibility exceeds the minimum requirement, wherein the commutation means is further for informing the second storage device of the detection result, and wherein responsive to a detection result indicating that the commitment is violated, the second storage device takes corresponding action(s) to delete, and thereby cause loss of data of, a file(s) originated from the first storage device and stored outside the first storage device within the group of devices.

20. The grouping apparatus of claim 19, wherein the group includes a third storage device, wherein the file(s) originated from the first storage device is/are stored in the third storage device, and wherein the corresponding action(s) taken by the second storage device include informing the third storage device to delete the file(s) stored in the third storage device that originated from the first storage device.

21. A method for grouping a plurality of storage devices including a first storage device and a second storage device, comprising:

receiving a commitment of an availability of a certain storage space from the first storage device within a group of devices in a trust environment and another commitment of an availability of another certain storage space from the second storage device within the group of devices, wherein the commitments of the group member devices can be different from each other as long as each commitment reaches a registration rule of the group of devices, wherein the registration rule comprises (a) a predetermined minimum storage capacity sharing with other group member devices, (b) an undisturbance of a file originated from a source device stored in the certain storage space, and (c) a predetermined minimum requirement of number of hours per day of online accessibility of the certain storage space;

respectively registering the first storage device and the second storage device as one member of the group of devices, wherein each group member device is bound by its respective commitment to the group of devices;

detecting the availability of the certain storage space of the first storage device to produce a detection result (i) by itself or (ii) in response to an inquiry received from the source device, wherein the detection result includes an indication that (a) a file from the source device stored by the storage apparatus is still there, (b) the stored file is undisturbed, and (c) an online accessibility exceeds the minimum requirement; and informing the second storage device of the detection result, wherein responsive to a detection result indicating that the commitment is violated, the second storage device takes corresponding action(s) to delete, and thereby cause loss of data of, a file(s) originated from the first storage device and stored outside the first storage device within the group of devices.

22. The method of claim 21, wherein the group includes a third storage device, wherein the file(s) originated from the first storage device is/are stored in the third storage device, and wherein the corresponding action(s) taken by the second storage device include informing the third storage device to delete the file(s) stored in the third storage device that originated from the first storage device.

23. A computer-readable medium embodied with a computer program executable by a computer for grouping a plurality of storage devices including a first storage device and a second storage device, comprising:

code for receiving a commitment of an availability of a certain storage space from the first storage device within a group of devices in a trust environment and another commitment of an availability of another certain storage space from the second storage device within the group of devices, wherein the commitments of the group member devices can be different from each other as long as each commitment reaches a registration rule of the group of devices, wherein the registration rule comprises (a) a predetermined minimum storage capacity sharing with other group member devices, (b) an undisturbance of a file originated from a source device stored in the certain storage space, and (c) a predetermined minimum requirement of number of hours per day of online accessibility of the certain storage space;

code for respectively registering the first storage device and the second storage device as one member of the group of devices, wherein each group member device is bound by its respective commitment to the group of devices;

code for detecting the availability of the certain storage space of the first storage device to produce a detection result (i) by itself or (ii) in response to an inquiry received from the source device, wherein the detection result includes an indication that (a) a file from the source device stored by the storage apparatus is still there, (b) the stored file is undisturbed, and (c) an online accessibility exceeds the minimum requirement; and code for informing the second storage device of the detection result, wherein responsive to a detection result indicating that the commitment is violated, the second storage device takes corresponding action(s) to delete, and thereby cause loss of data of, a file(s) originated from the first storage device and stored outside the first storage device within the group of devices.

* * * * *